(12) United States Patent
Shafer

(10) Patent No.: US 11,143,793 B2
(45) Date of Patent: Oct. 12, 2021

(54) STORM OUTAGE MANAGEMENT SYSTEM

(71) Applicant: Northview Weather LLC, Barton, VT (US)

(72) Inventor: Jason Shafer, Barton, VT (US)

(73) Assignee: Northview Weather LLC, Barton, VT (US)

( * ) Notice: Subject to any disclaimer, the term of this patent is extended or adjusted under 35 U.S.C. 154(b) by 343 days.

(21) Appl. No.: 16/213,149

(22) Filed: Dec. 7, 2018

(65) Prior Publication Data

US 2019/0179053 A1 Jun. 13, 2019

Related U.S. Application Data

(60) Provisional application No. 62/595,689, filed on Dec. 7, 2017.

(51) Int. Cl.
*G01W 1/10* (2006.01)
*G01W 1/14* (2006.01)
*G06N 5/04* (2006.01)

(52) U.S. Cl.
CPC ............... *G01W 1/10* (2013.01); *G01W 1/14* (2013.01); *G06N 5/048* (2013.01)

(58) Field of Classification Search
CPC ........................... G01W 1/10; G01W 2201/00; G01W 2203/00
USPC ........................................................ 702/10, 3
See application file for complete search history.

(56) References Cited

U.S. PATENT DOCUMENTS

| | | | |
|---|---|---|---|
| 9,297,723 B1* | 3/2016 | Hofmann | G06N 20/00 |
| 2014/0257913 A1* | 9/2014 | Ball | G06Q 10/04 705/7.25 |
| 2016/0306075 A1* | 10/2016 | Heng | G06N 20/00 |
| 2017/0249056 A1* | 8/2017 | Rainey | G06F 16/9537 |
| 2018/0240137 A1* | 8/2018 | Radich | G06F 17/18 |
| 2018/0330242 A1* | 11/2018 | Dubois | G06N 7/005 |
| 2019/0228362 A1* | 7/2019 | Anagnostou | G06N 5/02 |

* cited by examiner

*Primary Examiner* — Ricky Go
(74) *Attorney, Agent, or Firm* — Shawn Gordon, Esq.; Dunkiel Saunders Elliott Raubvogel & Hand, PLLC

(57) ABSTRACT

A system according to the present disclosure assists utility companies with understanding the potential impact of wet snow and ice accumulations that have the potential to bring down utility infrastructure, such as power lines. The system described herein uses a probabilistic forecast methodology, using weather forecasts as inputs, to develop probable ice and wet-snow accretion predictions and uses those predictions to develop a number of possible events and, in certain embodiments, the events' locations and time of occurrence. The system can provide a probabilistic map of potential impacts to utility lines, thereby giving utility companies the ability to proactively deploy crews before storms arrive.

20 Claims, 11 Drawing Sheets

STORM OUTAGE MANAGEMENT SYSTEM

RELATED APPLICATIONS

This application claims priority to U.S. Provisional Application No. 62/595,689, filed Dec. 7, 2017 and titled "STORM OUTAGE MANAGEMENT SYSTEM", which is incorporated by reference in its entirety.

FIELD OF INVENTION

The present invention generally relates to predictive electric utility storm outage management, and more particularly to a storm outage management system that facilitates crew resource management based on predictive modeling.

BACKGROUND

Energy and utility companies provide power to customers via power plants, e.g., gas-fired plants, hydro-electric plants, solar arrays, wind turbine generators, etc., and the power is transmitted to customers via a transmission and distribution system that includes power lines and other electrical components necessary to deliver power to its customers.

Severe weather conditions, such as ice storms and snow storms, can cause power outages that result in the disruption of power flow to customers. For example, ice and wet snow buildup can knock trees into overhead power lines or cause infrastructure failure by exceeding design load limits. While some power outages may be of short duration (e.g., a few seconds), many power outages require physical repair or maintenance to the electric distribution system before the power can be restored. For example, if a tree knocks down a home's power line, a maintenance crew may have to repair the downed power line before power can be restored to the home. In the meantime, customers are left without power, which is at least inconvenient but could be serious in extreme weather conditions (e.g., freezing cold weather conditions). Therefore, it is very important to restore power quickly.

Large storms often cause multiple power outages in various portions of the electric distribution system. In response, electric utilities dispatch maintenance crews into the field to perform the repairs. If the storm is large enough, external maintenance crews are often secured pre-storm from neighboring electric utilities and from external contracting agencies. Securing, pre-storm staging and also dispatching the crews in an efficient manner during and after the storm, therefore, is important to the quick and efficient restoration of power.

Once the storm hits, an electric utility traditionally determines where to send the crews based on, for example, telephone calls, texts, or mobile app communications from customers (or monitoring systems used by the electric utility). Conventional outage management systems log customer input and dispatch crews to the site of the disturbance based on the customer input. Conventional outage management systems typically assume that inputs from customers that are near each other are associated with a single disturbance or power outage. These conventional outage management systems do not function well under severe weather scenarios for various reasons. Moreover, these management systems are reactive instead of proactive, meaning that the electric utility is always playing catchup to storm damage. Thus, there is a need for systems, methods, and the like, to predict outage scenarios based upon particular weather situations so as to allow electric utilities to effectively commit and position resources prior to the incoming weather so as to limit down-time for customers.

BRIEF SUMMARY OF THE INVENTION

In a first exemplary aspect, a utility infrastructure damage prediction system that is based on meteorological data is described, the meteorological data including weather forecast information, the system comprising: a processing device; and a non-transitory, processor-readable storage medium, the non-transitory, processor readable storage medium comprising one or more programming instructions thereon that, when executed, cause the processing device to: receive a plurality of weather forecasts related to a geographical region, the plurality of weather forecasts having spatial and temporal information; receive an infrastructure dataset that includes information related to the location of utility infrastructure; receive a sensed dataset including a predicted temperature and humidity information associated with the geographical region; automatically determine a precipitation type and an amount of precipitation in a plurality of sub-regions of the geographical region based upon the plurality of weather forecasts and the sensed dataset; and predict the potential damage to the utility infrastructure and the location and timing of the potential damage based upon the precipitation type, the amount of precipitation, and the infrastructure dataset.

In another aspect, a utility infrastructure damage prediction system is described, the utility infrastructure damage prediction system comprising: a plurality of sensors suitable for collecting information related to the weather and including, at least a temperature and humidity sensor, wherein the plurality of sensors are spatially dispersed within a utility infrastructure region; a computer system in electronic communication with the plurality of sensors, the computer system having a processing device and a non-transitory, processor-readable storage medium, the non-transitory, processor readable storage medium comprising one or more programming instructions thereon that, when executed, cause the processing device to: receive, as inputs, a plurality of weather forecast datasets; receive, as inputs, information from the plurality if sensors; develop probable ice and/or wet-snow accretion predictions based upon the plurality of weather forecasts and the plurality of sensors; and determine a number, timing, and location of possible outage events in the utility infrastructure region based on the probable ice and/or wet snow accretion predictions.

In yet another aspect, a method of deploying infrastructure resources based upon weather forecasts is described, the method comprising: creating a probabilistic weather forecast from a plurality of forecasts multiple days before a storm impacts a desired region, wherein the creating includes the steps of: receiving a plurality of weather forecasts related to a geographical region, the plurality of weather forecasts having spatial and temporal information; receiving an infrastructure dataset that includes information related to the location of utility infrastructure; receiving a sensed dataset including a predicted temperature and humidity information associated with the geographical region; automatically determining a precipitation type and an amount of precipitation in a plurality of sub-regions of the geographical region based upon the plurality of weather forecasts and the sensed dataset; and predicting the potential damage to the utility infrastructure and the location and timing of the potential damage based upon the precipitation type, the amount of precipitation, and the infrastructure dataset; and deploying infrastructure resources based upon the probabilistic weather forecast.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
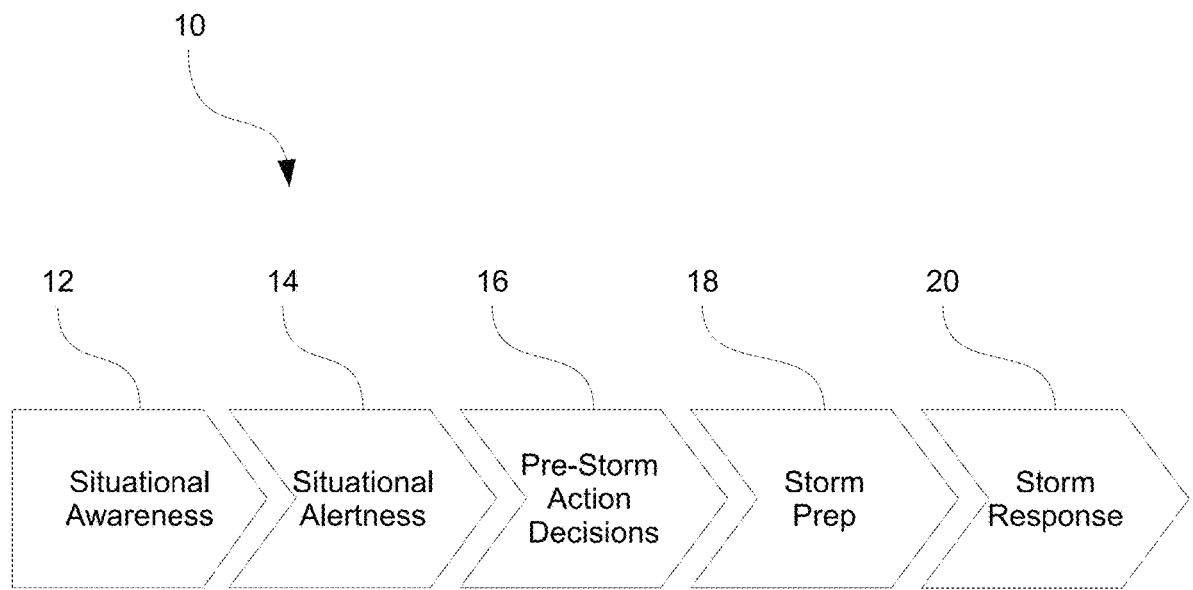
FIG. 1 is a process diagram depicting the timeline of storm prediction and response.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

A storm outage management system (SOMS) according to the present disclosure assists utility companies with understanding the potential impact of wet snow and ice accumulations during and over the course of a winter storm that have the potential to bring down power lines (a downed or disabled power line or related component is referred to in the utility industry as an "event" and also referred to herein as an "outage"). For the purposes of this disclosure, an "event" is a utility component/infrastructure failure caused by excessive load of wet snow or ice. These failures may result from tree-infrastructure interactions in right-of-ways or by exceeding engineered load standards. A SOMS according to certain embodiments of the present disclosure uses a probabilistic forecast methodology, using weather predictions as inputs, to develop probable ice and wet snow accretion predictions and uses those predictions to develop a number of possible events and, in certain embodiments, the events' locations over a given time period. A SOMS according to certain embodiments of the present disclosure can provide a probabilistic map of potential impacts to utility lines, thereby giving utility companies the ability to proactively deploy crews before storms arrive.

Turning now to the figures, FIG. 1 shows a typical storm preparedness timeline 10, which is a high level process for how electric utility companies prepare for and execute during a storm event. Working from left to right, at step 12 a preparedness team would typically become aware of and consider the likelihood of a possible storm 3 to 7 days (i.e., develop situational awareness) before the storm would hit the region. A few days later (step 14), the preparedness team would have available actionable information, such as the outage risk information provided by a SOMS 100 as discussed in detail below, that would alert them (i.e., situational alertness) as to the likelihood of a storm in their region, at which point pre-storm action decisions at step 16 would begin. The day before the storm hits the region, at step 18, storm preparations would be conducted, such as, but not limited to, securing extra crews and staging crews throughout the area that is expected to be impacted by the storm. One of the advantages of SOMS 100 is that the team doing the preparations will have better information related to the impact on utility infrastructure—in this context, impact is amount of damage, timing of the damage, and location of the damage. SOMS 100 allows preparedness teams to more efficiently deploy resources and thus more quickly respond to impacts to utility infrastructure. For the purposes of this disclosure, the term deploy shall mean to ready for the storm, to commit to the storm, or to move into position to react to the storm. Upon impact, at step 20, storm response, i.e., repairing utility infrastructure, takes place until all customers' service is restored. The responsiveness of the preparedness team is understandably based upon the information available. Thus, the more accurate and precise the information that is made to the preparedness team, the better the team can plan and respond to the storm and the quicker customers' service can be restored.

Figure 2:
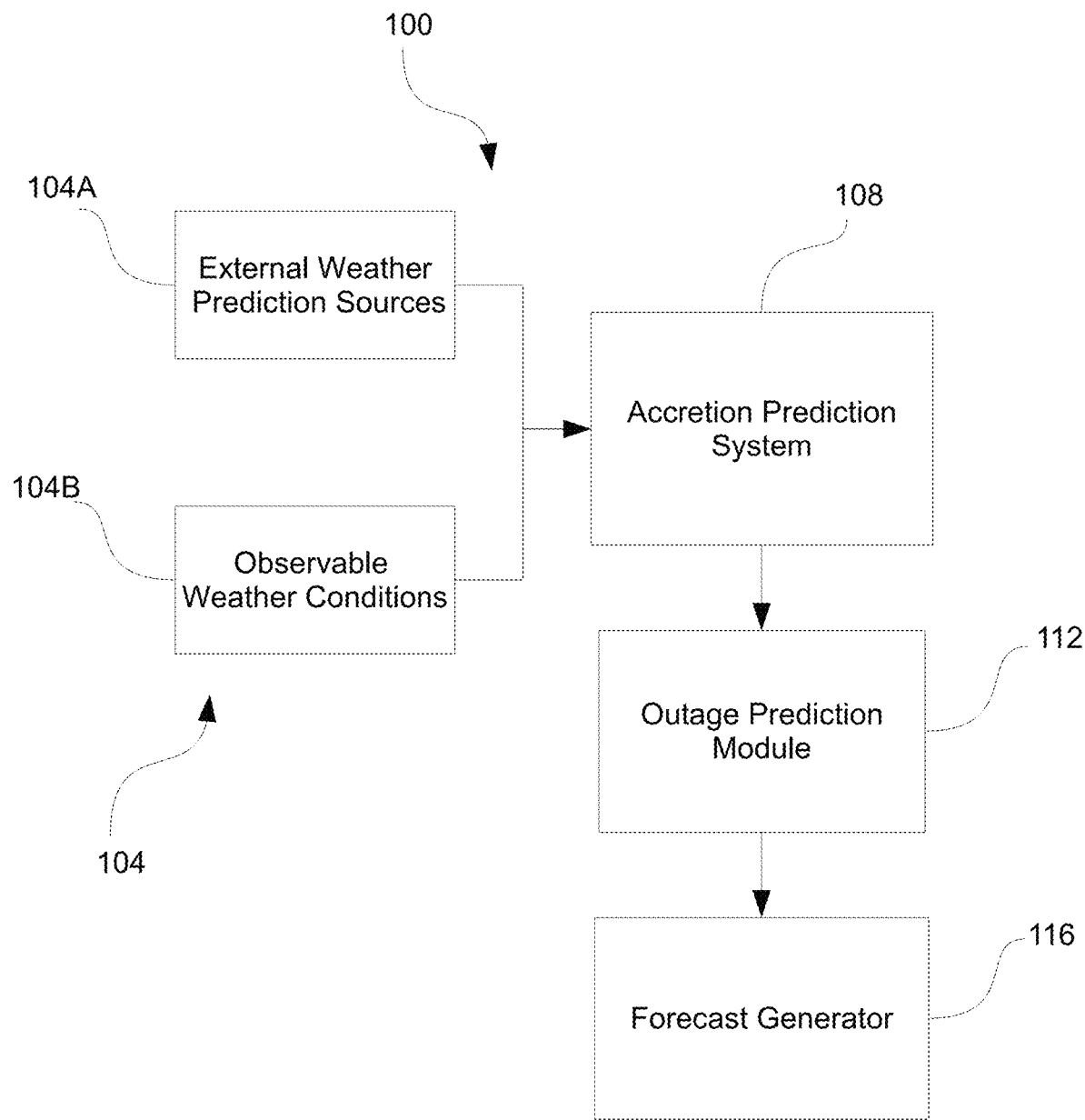
FIG. 2 is a block diagram of a storm outage management system according to an embodiment of the present invention.

FIG. 2 shows an exemplary storm outage management system, SOMS 100. At a high level, SOMS 100 uses time-based weather forecast information, utility data, and, in certain embodiments, sensed external information, to produce an outage risk assessment that shows, for example, the impact to utility infrastructure by region/area over time. In certain embodiments, SOMS 100 provides a "best" estimate of impact to infrastructure over time. In certain embodiments, SOMS 100 provides a range of predicted values along with probabilities of the impacts occurring throughout the course of a weather event.

In an embodiment, SOMS 100 includes input modules 104 (e.g., weather prediction sources 104A and observable weather conditions 104B) that feed an accretion prediction system 108. Weather prediction information can be provided from third-party resources via, for example, an information network. Third-party resources can include, but are not limited to, the Global Forecast System and the Global Ensemble Forecast System (both currently produced by the National Centers for Environmental Prediction of College Park, Md.). Observable weather conditions 104B may be procured via one or more sensors that collect information related to observed weather conditions, such as, but not limited to, wind speed, via an anemometer; a temperature via a thermometer or thermocouple; a pressure, via a barometer; a humidity, via a sling psychrometer and/or a hygrometer. The primary values desired of weather forecasts used by SOMS 100 are temperature, wind speed, predicted precipitation amount and type (if available), and humidity.

Accretion prediction system 108 is configured to determine the amount of accretion of a given type or precipitation, e.g., freezing rain, wet snow, snow, etc., over a period of time. Thus, for example, accretion prediction system can predict the amount of freezing ice that would be expected to accumulate from the beginning of a storm event to a desired time (e.g., the entirety of the duration of the storm event or a portion thereof). Based upon the results from accretion prediction system 108 (as discussed below with respect to FIGS. 3 and 4) the result is provided to outage prediction module 112, which can predict of the number of potential events within a given area over a desired period of time. The results of outage prediction system 112 are fed to forecast generator 116 which uses the potential outcomes to produce a forecast for managing utility resources.

Figure 3:
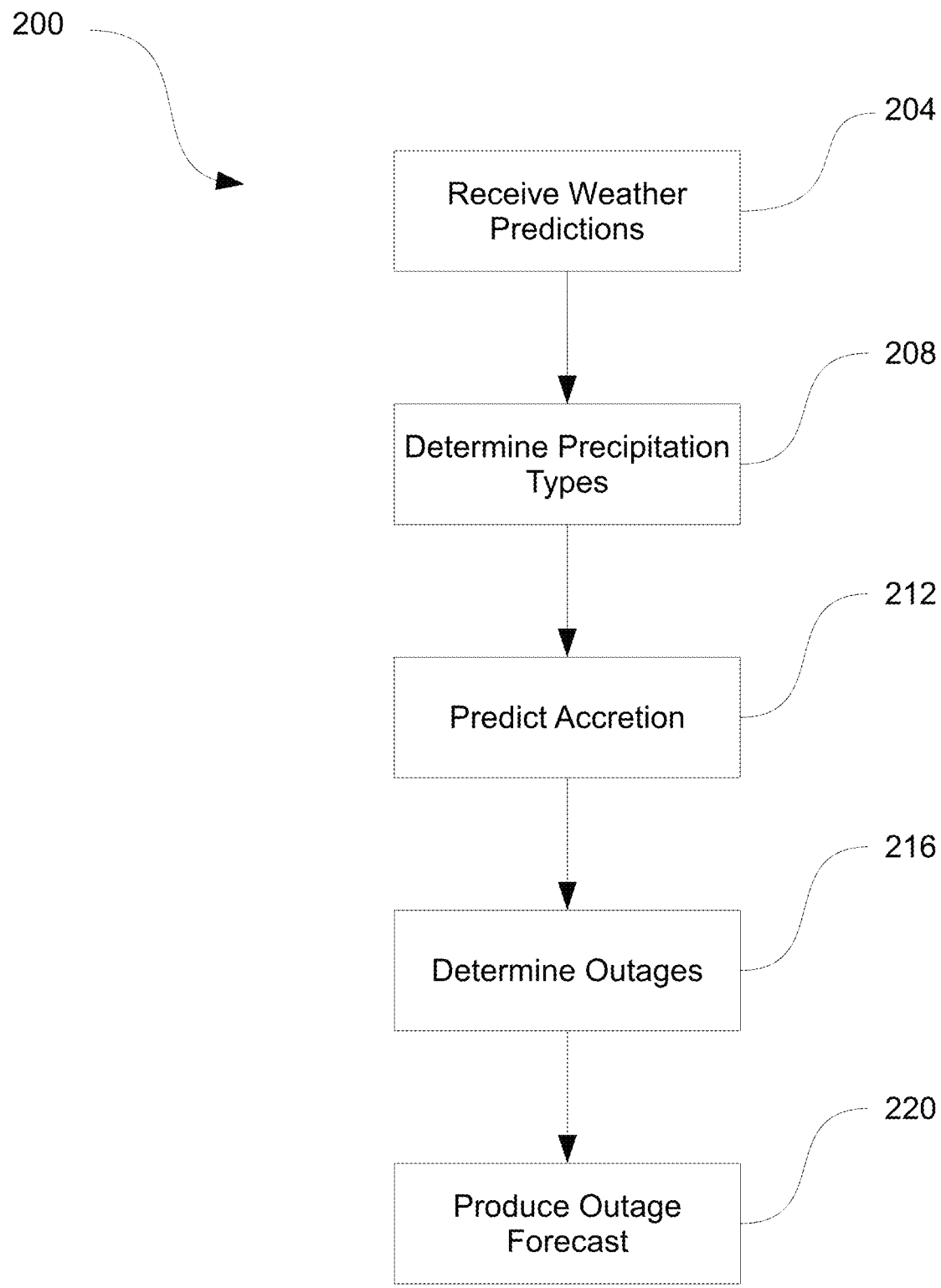
FIG. 3 is a block diagram of a process for preparing an outage prediction forecast according to an embodiment of the present disclosure.

FIG. 3 shows an exemplary block diagram of a process 200 for producing an outage prediction forecast. At a high level, a useful outage forecast is dependent upon accurate weather forecasts regarding precipitation amounts and the hydrometeor phase (precipitation type) of the precipitation, the snow and ice accretion predictions, and the relationship of the accretion amount, which will vary according to type of precipitation, to infrastructure damage.

At step 204, weather predictions are received. Preferably, multiple weather predictions, from multiple sources, are received as inputs so as to be able to determine a statistical forecast or probability distribution for the weather in a given area over a period of time. Each forecast weather data source can be considered a forecast member of a system, with a distribution of forecast weather data determined by sampling each forecast member's forecast data onto what is often referred to as a grid box or common grid. As is known, each weather prediction forecast point (the particular place and time the forecast is derived) provided from weather forecast models can be represented at a location and time by a unique value. This unique value represents the weather forecast condition over some area (typically a parallelogram defined area, although other shapes could be used) beyond the forecast point known as a grid box. Numerical calculations can be conducted with grid box values to produce statistics for each grid box area. In an exemplary embodiment, a cumulative probability distribution is used to determine the forecast distribution at each grid box location. In other words, for each grid box location, values can be determined that give the range of values and the probability that any of those values would occur within the grid box.

As discussed previously with respect to FIG. 2, weather prediction information (forecasts) can be provided from third-party resources via a for example, an information network. Third-party resources can include, but are not limited to, the Global Forecast System and the Global Ensemble Forecast System. Observable weather conditions 104B may be procured via one or more sensors that collect information related to observed weather conditions, such as, but not limited to, wind speed, via an anemometer; a temperature via a thermometer or thermocouple; a pressure, via a barometer; a humidity, via a sling psychrometer and/or a hygrometer. The primary values desired of weather forecasts used by SOMS 100 are temperature, wind speed, predicted precipitation amount and type (if available), and humidity. Additionally, each of the forecast members can include a prediction on the amount and type of precipitation expected in the grid box, e.g., rain, freezing rain, snow, and sleet. These predictions can inform on the possible type of precipitation expected (when considered, in certain embodiments, with other factors, such as, temperature and humidity) and when changeover, if any, may occur (e.g., wet snow to snow, freezing rain to sleet, etc.) and can lend important information regarding the amount of accretion. It should be noted that weather forecasts do not typically provide changeover data per se, instead, a changeover can be inferred from other factors (e.g., temperature change expected during the period of measurement) and/or the forecast's change in prediction from one period to the next (e.g., from 1 am to 2 am freezing rain is predicted and from 2 am to 3 am sleet is expected).

At step 208, a determination is made as to whether the precipitation expected is of the type that would cause an outage (also referred to herein as an event as defined above, e.g., where electric utility infrastructure is damaged). Typically, the two types of frozen precipitation that would cause a utility line outage are freezing rain and snow, and particularly, wet snow. For example, for a certain upcoming storm, given 50 total forecast members (i.e., 50 forecasts for the region) with 30 members predicting freezing rain and the other 20 members predicting rain at one of the grid box locations, the data of the 30 members indicating freezing rain in the grid box location are used derive a cumulative probability distribution of the amount of freezing rain precipitation that leads to ice accretion. The fact that 20 members have predicted rain and not freezing rain is used to analyze the risk the event would actually occur. As would be understood, if only a minority of members predict freezing rain, the overall likelihood of a freezing rain event occurring is low.

At step 212, a prediction of the amount of accretion (i.e., build up) of freezing rain or wet snow is completed. In an embodiment, the accretion amount is derived hourly and can be aggregated into larger time periods to capture the accretion expected for the entire storm. For wet snow, it is understood that snow crystals contain liquid water that can be supercooled and that these snow crystals accrete and freeze to surfaces. However, it is less well understood as to: a) what constitutes "wet snow", b) the conditions that create wet snow accretion, or c) the fraction of wet snow crystals that will stick or accrete. Indicators that promote accretion include: i) snow with high water content, ii) nearly isothermal low-level atmospheric lapse rates, iii) rain to snow transitions, and iv) temperatures that remain around 0° Celsius. In an exemplary embodiment, the prediction of wet snow is based upon wet bulb temperatures, which has the advantage of being isolatable during a storm. In this context, "isolatable" means that the portion of the snow that can stick to utility infrastructure and therefore accrete is identifiable. Wet-bulb temperatures are also derivable from forecast information, such as, but not limited to, temperature and humidity predictions/measurements), and correlate to accretion efficiency, which is the fraction of snow that sticks and loads onto overhead power lines and trees. For example, wet-bulb temperatures about 0° C. and about −2° C. result in the greatest accretion efficiency and thus are the best predictors of wet-snow loading.

For freezing rain, it is generally presumed that freezing rain freezes on contact to materials (trees, power lines, etc.) after falling through a subfreezing layer of the atmosphere near the earth's surface. The accretion amount can be predicted by evaluating the precipitation rate, wind speed, and temperature. From these factors the thickness, e.g., one-dimensional ice growth, can be determined and from the one-dimensional ice thickness an estimate of the radial ice thickness is determined. In an embodiment, radial ice thickness is approximately 39% of the one-dimensional ice thickness when equally distributed around a cylinder. The radial ice thickness is useful because it can be used to determine whether loads on the utility infrastructure, e.g., transmission powerlines, exceed design standards.

Figure 5:
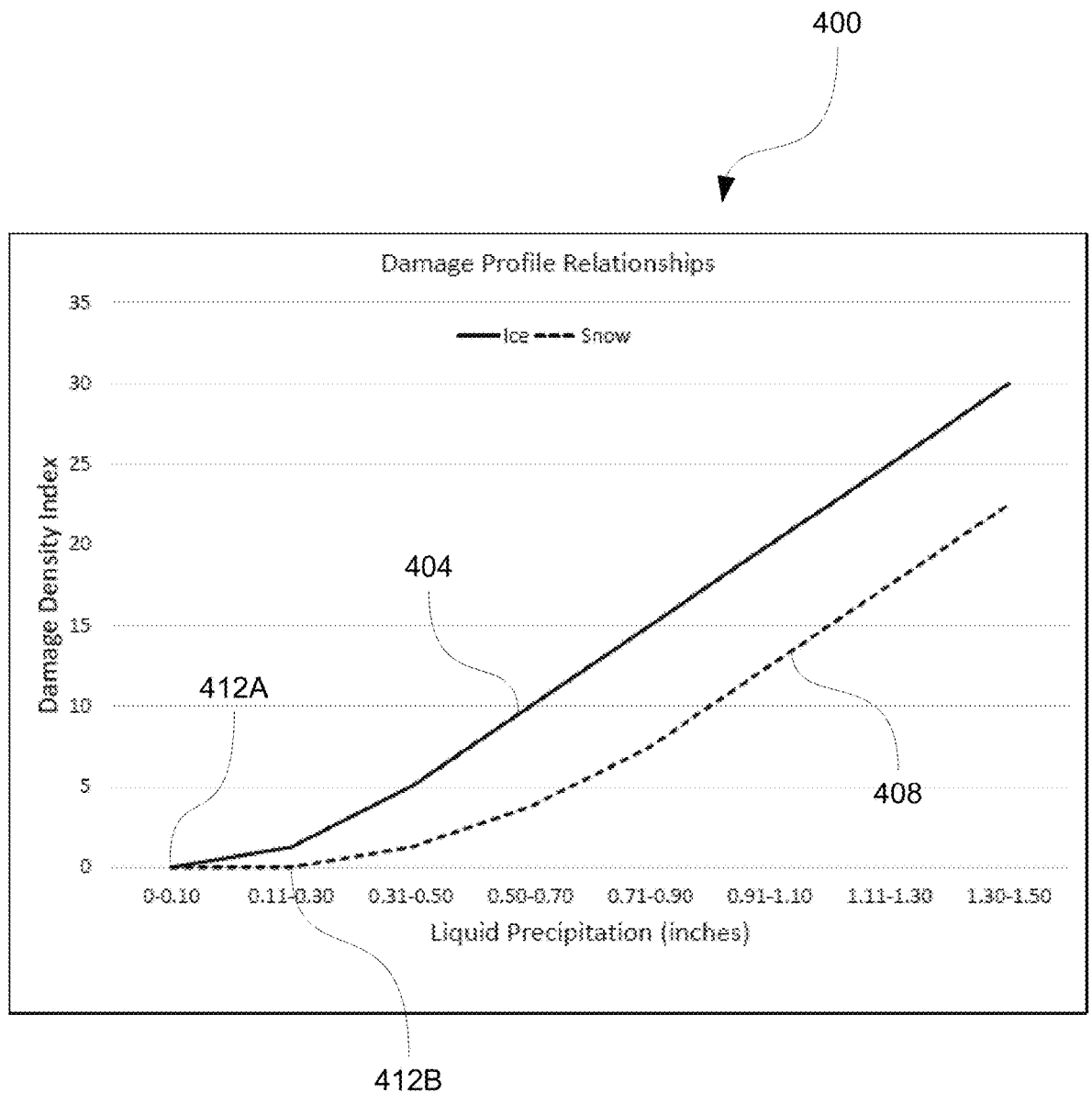
FIG. 5 is a chart showing the relationship between liquid precipitation and damage density.

At step 216, an estimated number of outages in a given area/region/zone are determined over a desired/given time period. It should be recalled that weather forecasts are spatially and temporally determined—meaning that the forecast not only provides information on the predicted weather, but also the predicted location and timing of the weather. Increasingly accurate forecasts are available on ever smaller areas, thereby allowing for the outage prediction forecast to offer predictions on a localized basis. Concomitantly, having access to localized weather forecasts, when combined with utility infrastructure information, e.g., powerline location information, allows for the determination of the number of outages in a desired area and over a given time period (or aggregated time period when the impact, e.g., accretion, over multiple periods are summed). Accordingly, in order to determine the number of outages, in addition to the accretion prediction of step 212, the amount of infrastructure that will be impacted by the accretion (i.e., where the weather impacts are going to be) is evaluated. In an embodiment, utility infrastructure information, and more particularly, power line geospatial line segment information, is considered by summing the total power line mileage within the same common grid box where the weather forecast information is provided. Outage event forecasts are calculated at each grid box by aggregating the wet snow or ice accretion within the grid box and using a damage density index, i.e., a prediction of the damage rate for a given accretion level (as shown in FIG. 5), to determine how many events are expected based upon the power line miles exposed. Outage event forecasts can be produced over larger areas of interest (e.g., service territories) by spatially aggregating each grid box location within areas of interest. At a high level, greater predicted accretion in areas with high infrastructure density results in a greater number of predetermined outages. In contrast, high levels of predicted accretion in areas of low infrastructure density may result in a lower number of predetermined outages. This relationship is depicted in FIG. 5. FIG. 5 shows the relationship between liquid participation and a damage density index—the damage density index being a ratio of the total number of events to the number of line miles of overhead powerlines exposed.

At step 220 an outage forecast is produced, which, is typically a visual representation of the number of outages expected in a given area over a period of time. The forecast can be a prediction of the total number of events for a given storm or period of time. In an embodiment, the forecast can be a probabilistic table that indicates the potential number of outages based upon alternative assumptions, such as, for example, the likelihood of a forecast being accurate. In another embodiment, the forecast can be a predictive map that identifies potential high impact areas by density of predicted outages. In another embodiment, the forecast can be a time series graph identifying the timing of predicted outages.

Figure 4:
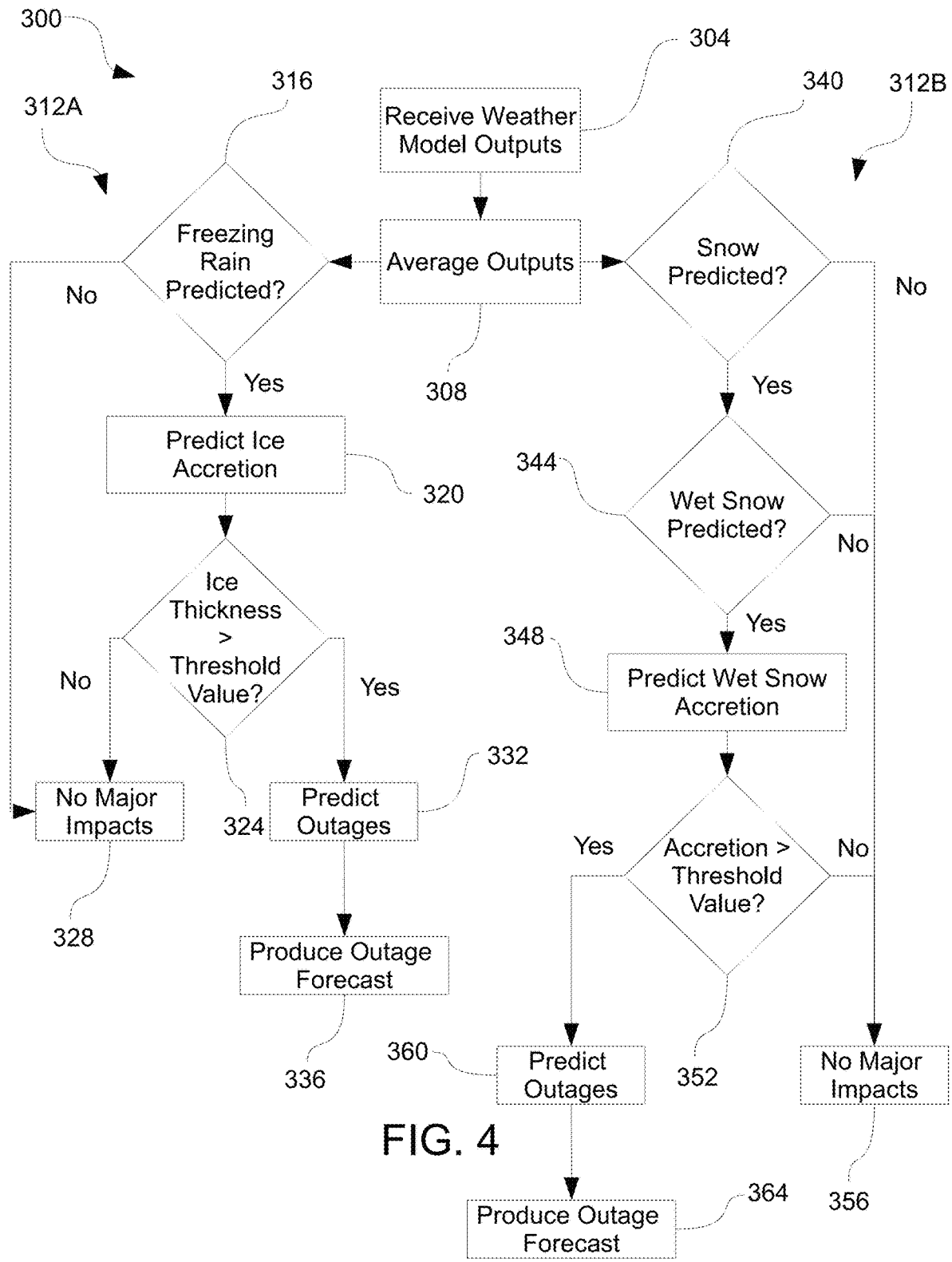
FIG. 4 is a block diagram of another outage prediction forecast according to an embodiment of the present disclosure.

FIG. 4 shows another exemplary process, process 300, for producing an outage forecast. Process 300 is similar to process 200, described above, but includes some additional criteria for producing the outage forecast. At step 304, weather forecast data (also known as weather model outputs) is received. As discussed previously with respect to FIG. 2, weather prediction information (forecasts) can be provided from third-party resources via, for example, an information network. Third-party resources can include, but are not limited to, the Global Forecast System and the Global Ensemble Forecast System. Observable weather conditions 104B may be procured via one or more sensors that collect information related to observed weather conditions, such as, but not limited to, wind speed, via an anemometer; a temperature via a thermometer or thermocouple; a pressure, via a barometer; a humidity, via a sling psychrometer and/or a hygrometer. The primary values desired of weather forecasts used by SOMS 100 are temperature, wind speed, predicted precipitation type (if available), and humidity. Additionally, as discussed above, with reference to FIG. 3, each of the forecasts considered preferably includes a prediction on the amount and type of precipitation expected, e.g., rain, freezing rain, snow, and sleet.

At step 308, a statistical output of the weather forecast data is determined and, in certain embodiments, a probabilistic distribution related to the weather data is developed. In an embodiment, about 50 forecast members are used to create a forecast probability, sampling each member's forecast data to a common grid box location. At each grid box location, a cumulative probability function is employed to generate forecast data distributions for the grid box for the relevant period of time; this results in a range of possible outcomes that can be interpreted as percentiles or probabilities (i.e., the $25^{th}$ percentile has a 75% chance of occurring). While the mean weather forecast data typically produces the most likely outcome, i.e., the most likely weather for the region under observation, the benefits of a probabilistic distribution include the ability to estimate the likelihood of any specific outcome (e.g., the likelihood of a certain number of events) and thus to provide the range of possible outcomes and the probability that any one of those outcomes would occur.

After step 308, process 300 diverges into two paths, 312A and 312B. It should be understood that paths 312A and 312B are not mutually exclusive and that process 300 may take both paths substantially simultaneously or sequentially.

Path 312A begins with step 316, where a determination is made as to whether freezing rain is predicted in the weather forecast. The determination as to whether freezing rain may occur may come from the weather data received from outside sources or may be based upon observed conditions. If no freezing rain is expected, the process proceeds to step 328, where the predicted outage result is that no major impacts are expected from freezing rain.

If freezing rain is expected, process 300 proceeds to step 320, where the ice accretion is determined. The amount of ice accretion expected can be determined in a similar way as discussed above with respect to process 200, step 212.

At step 324, a determination as to whether the aggregate ice thickness over the course of the storm event will exceed a threshold value. If the ice thickness is less than the threshold value, the number of outages is unlikely to be significant and process 300 proceeds to step 328. If ice thickness is predicted to above the threshold value, process 300 proceeds to step 332 where the number of outages is predicted. In an embodiment, the threshold value is between about 0.2 and 0.35 inches. It should be noted that process 200 or 300 can be implemented without a determination of whether a threshold is exceeded as the process, in those instances with low accretion, would result in a low or zero outage forecast. One of the advantages of using process 200 or 300 with a threshold determination is the ability to omit less useful reports.

Step 332 can be performed similarly to step 216 in process 200. Similarly, step 336, the predicted outage forecast, can be performed as described in step 220 of process 200.

Turning now to path 312B, at step 340, a determination as to whether snow is expected is made. The determination as to whether snow may occur may come from the weather data received from outside sources or may be a determination based upon weather conditions, such as, but not limited to, temperature, humidity, and other atmospheric conditions. If no snow is expected, the process proceeds to step 356, where the predicted outage result is that no major impacts are expected from snow.

At step 344, a determination as to whether wet snow is expected is made. The determination as to whether wet snow may occur may come from the weather data received from outside sources or may be a determination based upon weather conditions, such as, but not limited to, wet-bulb temperatures. If no wet snow is expected, the process proceeds to step 356, where the predicted outage result is that no major impacts are expected from wet snow.

If wet snow is expected, a prediction of wet snow accretion in a locale over a desired period of time is completed at step 348. Often, as weather forecasts are spatially and temporally determined, the prediction is the result of an aggregate calculation of forecasts for a given location, i.e., the sum of the expected wet snow over time. The amount of wet snow accretion expected can be determined in a similar way as discussed above with respect to process 200, step 212.

At step 352, the amount of wet snow loading is assessed. If the amount of wet snow loading is expected to be below a wet snow threshold value, process 300 proceeds to step 356, where the predicted outage result is that no major impacts are expected from wet snow. If the amount of wet snow loading is expected to be above the wet snow threshold value, process 300 proceeds to step 360, where the number of outages is predicted. In an exemplary embodiment, the wet snow threshold value is between about 0.4 and 0.7 inches of wet-snow liquid water equivalent.

Step 360 can be performed similarly to step 216 in process 200. Similarly, step 364, the predicted outage forecast due to wet snow, can be performed as described in step 220 of process 200.

FIG. 5, as discussed previously, is a chart 400 of liquid precipitation vs. a damage density index (a ratio of the total number of events to the number of line miles of power lines exposed). Ice accretion is shown by solid line 404 and wet snow accretion is shown by dotted line 408. Also, as seen in chart 400, there are "cut-in" thresholds, denoted as cut-in 412A and 412B, where the amount of liquid precipitation is low enough that no damage is expected. Cut-in 412A is the ice accretion cut-in threshold and cut-in 412B is the wet snow cut-in threshold. These two cut-in thresholds represent the criteria used in process 200, steps 224 and 252, and at similar points in process 300. In general, the relationship between each type of precipitation and the damage density index is substantially linear; however, different amounts of each type of precipitation are expected produce different amounts of damages given that freezing rain has a lower cut-in threshold. Thus, for example, an increase in ice accretion is predicted to cause more damage than a similar increase in wet snow accretion, because ice has a higher density than wet snow.

Figure 6:
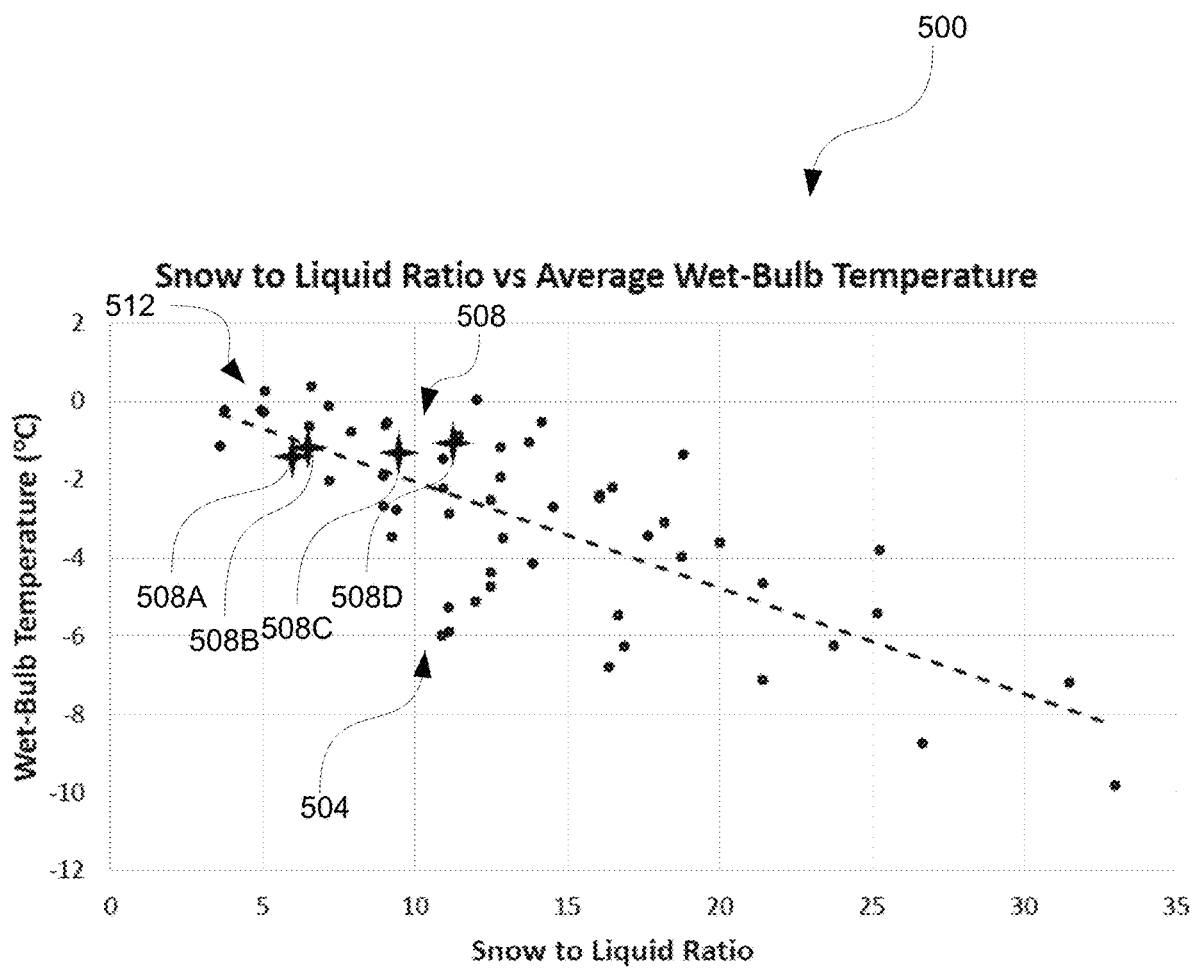
FIG. 6 is a chart of snow/liquid ratios to wet-bulb temperature.

FIG. 6 is a chart 500 plotting snow-to-liquid ratio vs. wet-bulb temperature. It has traditionally been assumed that the snow-to-liquid ratio was the determinative factor in wet snow accretion. More specifically, it was traditionally presumed that storms with a snow to liquid ratio of lower than 10:1 resulted in more damage. However, these previous assumptions are likely inaccurate. In chart 500, each dot 504 represent a storm and each "starred" point 508 (points 508A-D) in chart 500 represents a damaging (event-producing) storm. As shown, the snow-to-liquid ratio can vary considerably and damage-producing storms do not always have a snow-to-liquid ratio lower than 10:1 (point 508D). Moreover, not all storms with low snow-to-liquid ratios produced damage (e.g., dots in area 512). What is shown, however, is that each of the damaging storms had average surface wet-bulb temperatures near 0° Celsius or just below 0° Celsius.

Figure 7:
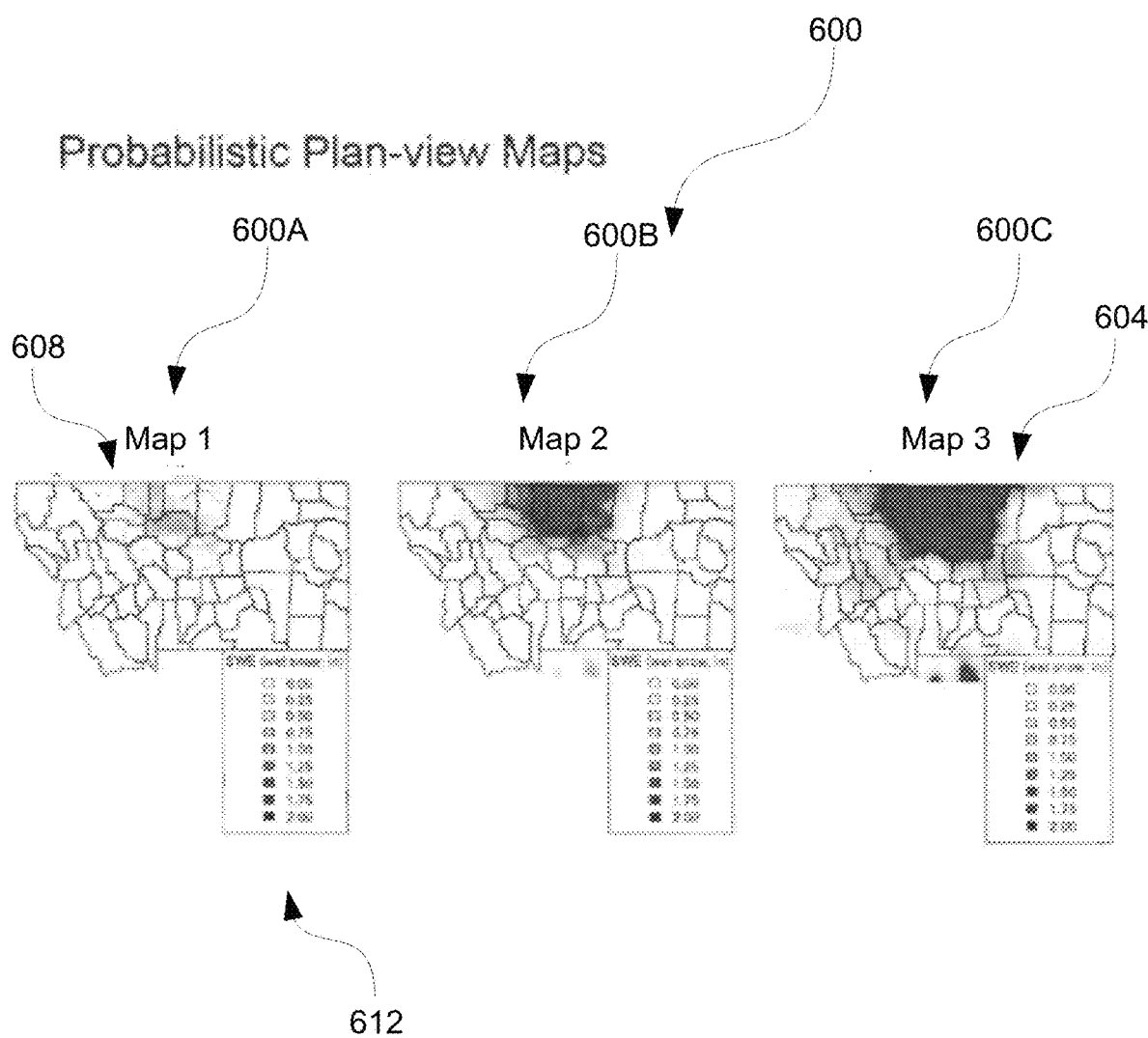
FIG. 7 are maps showing predictive accumulations of wet snow.

FIG. 7 shows three probabilistic plan maps 600 (maps 600A-C) that portray different predictions based upon the assumed weather forecast. The map 600A presumes a 90% chance ($10^{th}$ percentile) of the predicted accretion occurring with values equal to or greater than values shown in legend 612, map 600B presumes a 50% chance ($50^{th}$ percentile) of the prediction occurring, and map 600C presumes a 10% chance ($90^{th}$ percentile) of the prediction occurring with values equal to or greater than shown in legend 612. For each map 600, the darker the color, the greater the wet snow accretion amounts expected. Thus, for map 600C, there is a 10% chance that a significant portion of north-central Montana (area 604) would receive 2.00" of wet snow liquid. In contrast, there is a 90% chance of a small portion of central Montana (area 608) would have about 0.75" of wet snow liquid. As shown, with higher percentile predictions of accretion, the larger the expanded area of damage predicted and the intensity of damage also increases.

Figure 8:
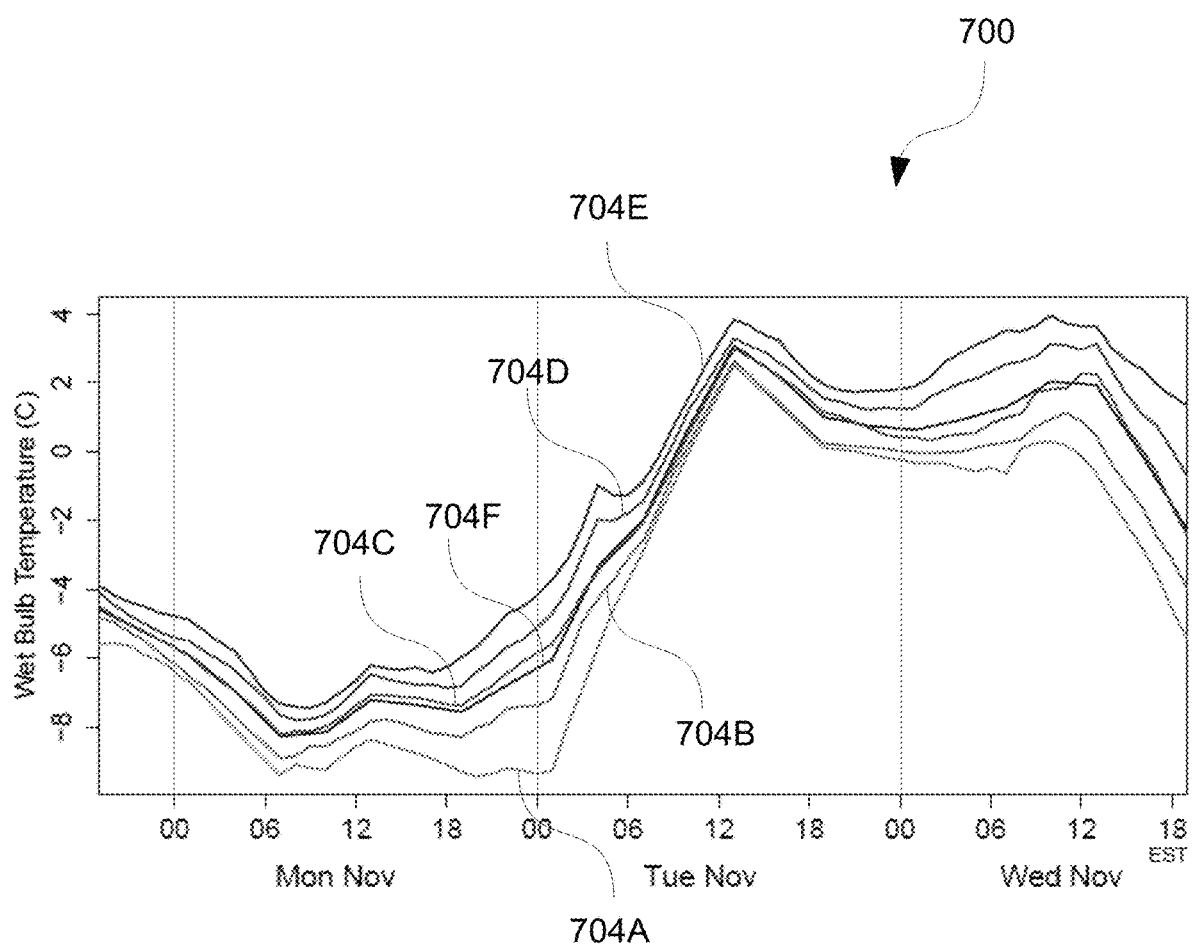
FIG. 8 is a chart showing wet-bulb temperature over time.

FIG. 8 shows a predictive chart 700 of wet-bulb temperatures over time. Each of lines 704 represents different predicted wet-bulb temperature over time. Lines 704A represents a 10% predictive value ($10^{th}$ percentile), line 704B represents a 25% predictive value, line 704C is a 50% predictive value, line 704D is a 75% predictive value, and line 704E is a 90% predictive value. Line 704F is a mean value of the predicted wet-bulb temperatures. Wet-bulb temperature predictions are used in methods 200 and 300 to determine the amount of wet-snow accretion, with wet snow expected when the temperature is about 0° Celsius. In an embodiment, once the wet-bulb temperature falls below or above a predetermined range (near 0° Celsius and just below 0° Celsius), little to no accretion of wet snow is expected. This information can be used to highlight a peak storm window timeframe when damage may occur—in other words, peak accretion intensity can be developed over certain timeframes, e.g., hourly, which can be reported and/or aggregated to provide the total loading of wet snow over a desired period of time.

Figure 9:
FIG. 9 is a chart of forecasted wet snow versus probability.

FIG. 9 shows a predictive chart 800 of wet-snow liquid forecasted and the probabilistic distribution of the forecast and the impacted overhead power lines exposed to the forecasted wet-snow accretion (i.e., potentially subject to damage). As discussed above, by predicting accretion on a grid-controlled basis, the exposure of utility infrastructure can be deduced by overlaying the infrastructure into the grid locations and applying the accretion prediction. FIG. 9 does not, however, indicate the expected number of events. In order to determine the number of events, the total number of power line miles in each grid box is multiplied by a failure rate (i.e., deduced from the damage density index of FIG. 5) to determine the event forecast. For example, if 1000 miles of overhead power line are exposed to 1.0" of wet snow accretion, and the failure rate is 2 events per 100 miles of overhead power line (or a damage density index of 2 in this example (not necessarily with reference to FIG. 5)) of line, then 20 events would be forecasted. Each grid box can be summed over areas of interest. This information can be a used to create the maps 600A-C shown in FIG. 7 or to provide efficient summary information to a utility about the potential magnitude, location and timing of storm impacts.

Figure 10:
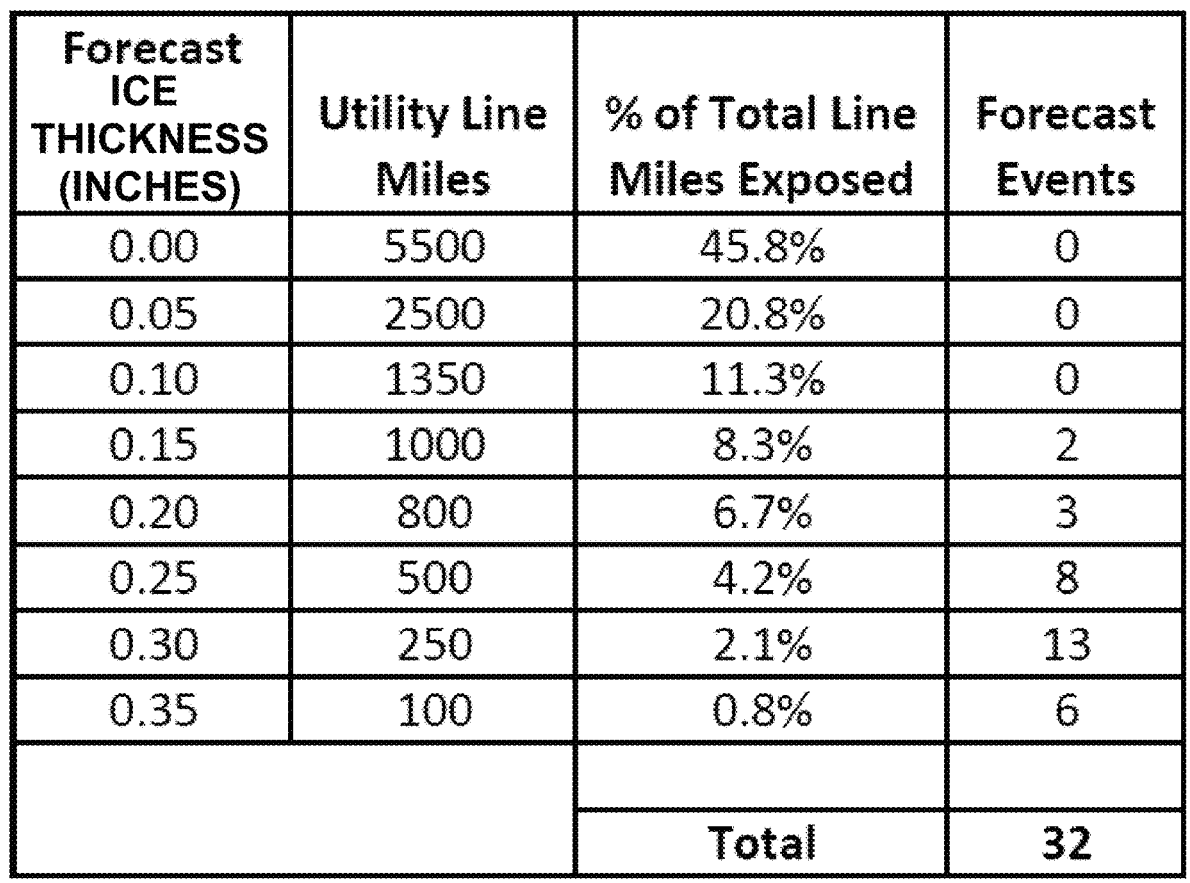
FIG. 10 is a table of forecasted ice and the relationship to forecasted impacts on utility lines.

FIG. 10 shows a table 900 with columns that relate: forecasted ice thickness, total number utility overhead power line miles possibly impacted by the amount of forecasted ice thickness, predicted exposure of the percentage of utility line miles to the one-dimensional ice thickness, and the predicted number of events. Greater amounts of ice thickness typically affect smaller areas, thus even though the prediction of 0.35 inches of ice thickness would be expected to produce more damage, this amount of ice accretion will be over a smaller number of overhead line miles and thus the total number of events is less. It should be understood, however, that the likelihood of these events occurring may be greater because of the magnitude of the ice accretion.

Figure 11:
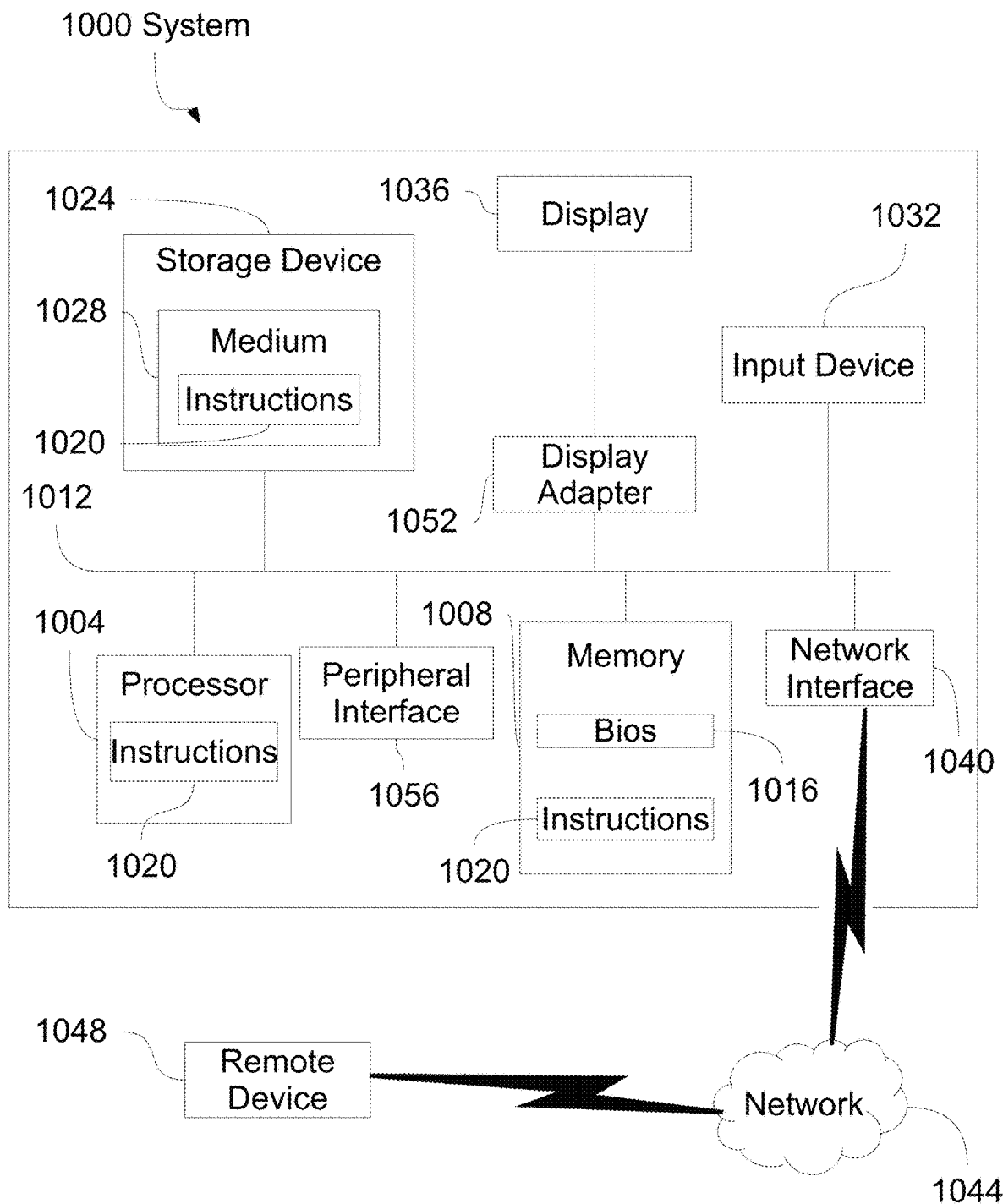
FIG. 11 is a block diagram of a computer system according to an embodiment of the present disclosure.

FIG. 11 shows a diagrammatic representation of one embodiment of a computing device in the exemplary form of a system 1000 within which a set of instructions for implementing a process, such as process 200 or process 300, can be executed or performed. It is also contemplated that multiple computing devices may be utilized to implement a specially configured set of instructions for causing a device to perform any one or more of the aspects and/or methodologies of the present disclosure. System 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Memory 1008 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 1016 (BIOS), including basic routines that help to transfer information between elements within system 1000, such as during start-up, may be stored in memory 1008.

Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

System 1000 may also include a storage device 1024. Examples of a storage device (e.g. storage device 1024) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for system 1000. In one example, software 1020 may reside, completely or partially, within machine-readable medium 1028. In another example, software 1020 may reside, completely or partially, within processor 1004.

System 1000 may also include an input device 1032. In one example, a user of system 1000 may enter commands and/or other information into system 1000 via input device 1032. In another example, input device 1032 receives weather data from various sources via an internet connection. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above. Input device 1032 may also include sensors or facilitate the input of weather information by categorizing it for inclusion in a database or memory 1008 or storage device 1024.

A user may also input commands and/or other information to system 1000 via storage device 1024 (e.g., a removable disk drive, a flash drive, etc.) and/or network interface device 1040. A network interface device, such as network interface device 1040 may be utilized for connecting system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from system 1000 via network interface device 1040.

System 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide a graphical representation of a utility resource, a location of a land parcel, and/or a location of an easement to a user. In addition to a display device, a system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A utility infrastructure outage prediction system that is based on meteorological data, the meteorological data including weather forecast information, the system comprising:
    a processing device; and
    a non-transitory, processor-readable storage medium, the non-transitory, processor readable storage medium comprising one or more programming instructions thereon that, when executed, cause the processing device to:
        receive a plurality of weather forecasts related to a geographical region, the plurality of weather forecasts having spatial and temporal information;
        receive an infrastructure dataset that includes information related to a location of utility infrastructure;
        receive a sensed dataset including a predicted temperature and humidity information associated with the geographical region;
        automatically determine a precipitation type and an amount of precipitation in a plurality of sub-regions of the geographical region based upon the plurality of weather forecasts and the sensed dataset; and
        predict a potential damage to the utility infrastructure and a location and timing of the potential damage based upon the precipitation type, the amount of precipitation, and the infrastructure dataset.

2. The utility infrastructure outage prediction system according to claim 1, wherein one or more of the plurality of weather forecasts includes a prediction of the precipitation type.

3. The utility infrastructure outage prediction system according to claim 1, wherein the predicted temperature is a wet-bulb temperature.

4. The utility infrastructure outage prediction system according to claim 3, wherein the wet-bulb temperature is used to determine whether the precipitation type is wet snow.

5. The utility infrastructure outage prediction system according to claim 1, wherein if the precipitation type is freezing rain, the predicting the potential damage compares a predicted ice thickness to an ice thickness threshold value.

6. The utility infrastructure outage prediction system according to claim 1, wherein, if the precipitation type is wet snow, a wet-snow loading value is determined by a fraction of predicted wet snow that is predicted to load onto overhead power lines and trees determines and the predicting the potential damage compares the wet-snow loading value to a wet-snow threshold value.

7. The utility infrastructure outage prediction system according to claim 1, further including providing a probabilistic map of the potential damage to utility lines.

8. The utility infrastructure outage prediction system according to claim 1, wherein a probabilistic distribution related to the plurality of weather forecasts is developed.

9. The utility infrastructure outage prediction system according to claim 1, wherein the precipitation type is non-wet snow and no potential damage to the utility infrastructure is predicted.

10. A utility infrastructure outage prediction system comprising:
    a plurality of sensors suitable for collecting information related to weather and including, at least a temperature and humidity sensor, wherein the plurality of sensors are spatially dispersed within a utility infrastructure region;
    a computer system in electronic communication with the plurality of sensors, the computer system having a processing device and a non-transitory, processor-readable storage medium, the non-transitory, processor readable storage medium comprising one or more programming instructions thereon that, when executed, cause the processing device to:
        receive, as inputs, a plurality of weather forecast datasets;
        receive, as inputs, information from the plurality of sensors;
        develop probable ice and/or wet-snow accretion predictions based upon the plurality of weather forecast datasets and the information from the plurality of sensors; and
        determine a number, timing, and location of possible outage events in the utility infrastructure region based on the probable ice and/or wet snow accretion predictions.

11. The utility infrastructure outage prediction system according to claim 10, wherein one or more of the plurality of weather forecasts includes a prediction of the precipitation type.

12. The utility infrastructure outage prediction system according to claim 10, wherein at least one of the plurality of sensors provides a wet-bulb temperature.

13. The utility infrastructure outage prediction system according to claim 12, wherein the wet-bulb temperature is used to determine whether the precipitation type is wet snow.

14. The utility infrastructure outage prediction system according to claim 10, wherein if the developing concludes that ice accretion will occur, the determining includes comparing a predicted ice thickness to an ice thickness threshold value.

15. The utility infrastructure outage prediction system according to claim 10, wherein, if the developing concludes that wet-snow accretion will occur, the determining includes comparing a predicted wet-snow loading value to a wet-snow loading threshold value.

16. The utility infrastructure outage prediction system according to claim 10, further including providing a probabilistic map of the possible outages.

17. The utility infrastructure outage prediction system according to claim 10, wherein a probabilistic distribution related to the plurality of weather forecasts is developed.

18. A method of deploying infrastructure resources based upon weather forecasts comprising:
    creating a probabilistic weather forecast from a plurality of forecasts multiple days before a storm impacts a desired region, wherein the creating includes the steps of:

receiving a plurality of weather forecasts related to a geographical region, the plurality of weather forecasts having spatial and temporal information;

receiving an infrastructure dataset that includes information related to the location of utility infrastructure;

receiving a sensed dataset including a predicted temperature and humidity information associated with the geographical region;

automatically determining a precipitation type and an amount of precipitation in a plurality of sub-regions of the geographical region based upon the plurality of weather forecasts and the sensed dataset; and predicting a potential damage to the utility infrastructure and a location and timing of the potential damage based upon the precipitation type, the amount of precipitation, and the infrastructure dataset; and deploying infrastructure resources based upon the probabilistic weather forecast.

19. The method according to claim 18, wherein if the precipitation type is freezing rain, the predicting the potential damage compares a predicted ice thickness to an ice thickness threshold value.

20. The method according to claim 19, wherein if the precipitation type is wet snow, and wherein the predicting the potential damage compares a wet-snow loading value to a wet-snow threshold value.

* * * * *